(12) United States Patent
Geranio

(10) Patent No.: US 8,034,611 B1
(45) Date of Patent: Oct. 11, 2011

(54) SENSOR WAND, AND COMPOSTING APPARATUS INCLUDING SAME

(76) Inventor: Nicholas Louis Geranio, Calabasas, CA (US)

(*) Notice: Subject to any disclaimer, the term of this patent is extended or adjusted under 35 U.S.C. 154(b) by 2066 days.

(21) Appl. No.: 10/998,074

(22) Filed: Nov. 26, 2004

(51) Int. Cl.
*C12M 1/00* (2006.01)
*C12M 1/02* (2006.01)
*C12M 1/10* (2006.01)
*C05F 9/02* (2006.01)
*C05F 7/00* (2006.01)

(52) U.S. Cl. ............... 435/290.1; 435/290.2; 435/290.3; 435/290.4

(58) Field of Classification Search ............... 435/290.1, 435/290.2, 290.3, 290.4
See application file for complete search history.

(56) References Cited

U.S. PATENT DOCUMENTS
5,451,523 A 9/1995 von Fahnestock et al.

*Primary Examiner* — Michael Marcheschi
*Assistant Examiner* — Lydia Edwards
(74) *Attorney, Agent, or Firm* — Eric Karich

(57) ABSTRACT

A sensor wand is disclosed for use in a composting apparatus. The sensor wand includes an elongated body having two opposed ends and a central axis, multiple gas inlets positioned along the body for collecting gas samples, and multiple temperature sensors positioned along the body for measuring temperatures. One of the ends of the body is positioned on one side of the central axis, and the other end is positioned on an opposite side of the central axis. A described composting apparatus includes the sensor wand.

6 Claims, 2 Drawing Sheets

SENSOR WAND, AND COMPOSTING APPARATUS INCLUDING SAME

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to composting apparatus and sensor systems, and more particularly to sensor systems for composting apparatus.

2. Description of Related Art

In general, the term "compost" refers to a mixture of decaying organic matter. Compost is widely used to used to improve soil structure, to provides nutrients for plants, and to increase an ability of soil to retain water.

U.S. Pat. No. 5,451,523 to Von Fahnestock et al., incorporated herein by reference in its entirety, describes a modern composting process and a composting apparatus including a reactor vessel for containing a mixture, a sensor wand positioned in the reactor vessel for obtaining gas sample and temperature information within the reactor vessel, and a control unit for controlling the composting process dependent upon the gas sample and temperature information.

SUMMARY OF THE INVENTION

A sensor wand is disclosed for use in a composting apparatus. The sensor wand includes an elongated body having two opposed ends and a central axis, multiple gas inlets positioned along the body for collecting gas samples, and multiple temperature sensors positioned along the body for measuring temperatures. One of the ends of the body is positioned on one side of the central axis, and the other end is positioned on an opposite side of the central axis. A described composting apparatus includes the sensor wand.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
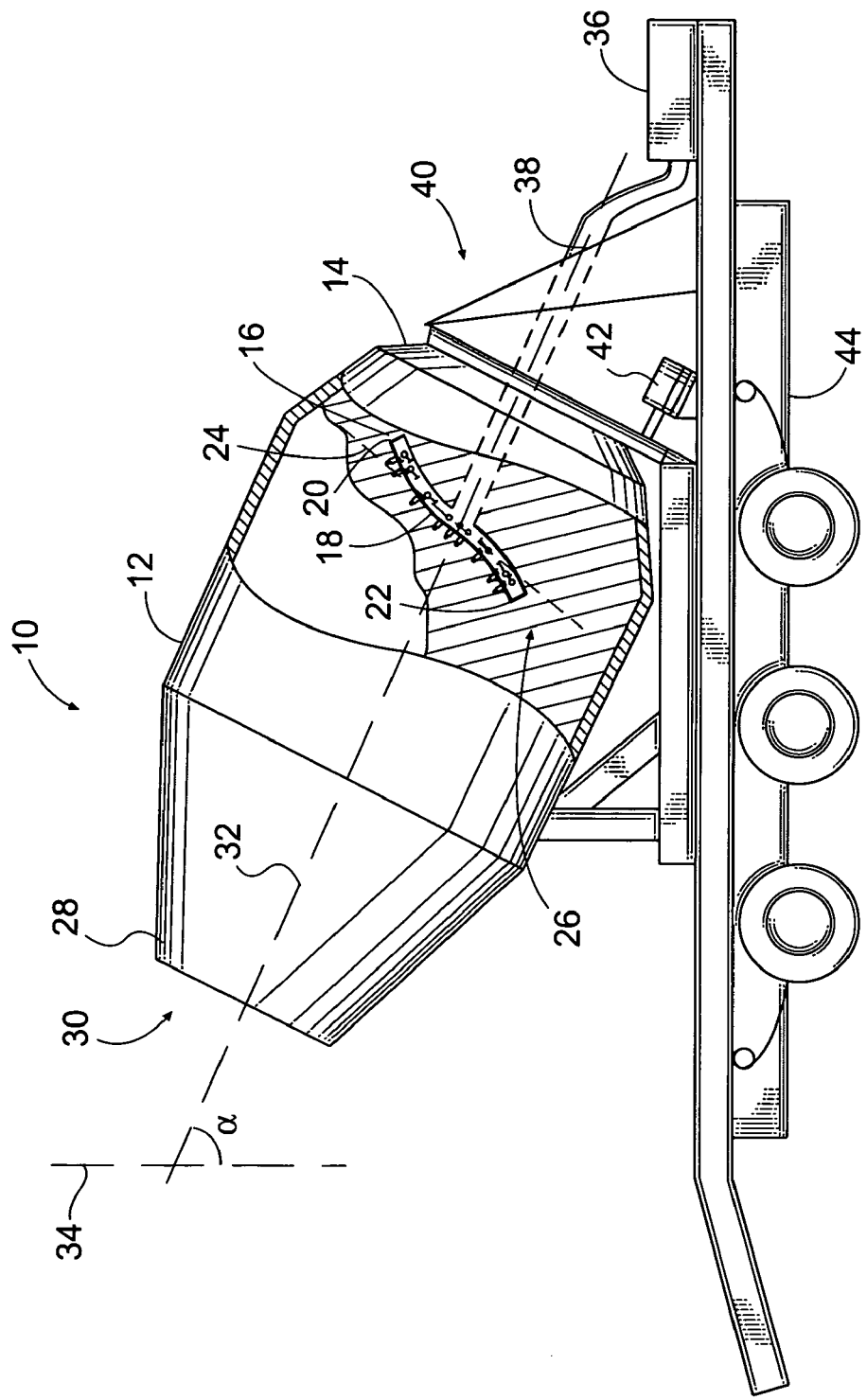
FIG. 1 is a side elevation view of one embodiment of a composting apparatus including a reactor vessel and a sensor wand positioned within the reactor vessel.

FIG. 1 is a side elevation view of one embodiment of a composting apparatus 10 including a reactor vessel 12 having a closed end 14 and a sensor wand 16 positioned within the reactor vessel 12 adjacent the closed end 14. In the embodiment of FIG. 1, the sensor wand 16 includes an elongated body 18 having an upper end 20 positioned above an opposed lower end 22 and a central axis 24, wherein the upper end 20 is positioned on one side of the central axis 24 and the lower end 22 is positioned on an opposite side of the central axis 24. More specifically, the upper end 20 of the sensor wand 16 curves away from the central axis 24 in a direction that is toward the closed end 14 of the reactor vessel 12, and lower end 22 curves away from the central axis 24 in a direction that is away from the closed end 14.

In FIG. 1 the reactor vessel 12 contains a material 26 undergoing a composting operation. As described in more detail below, multiple gas inlets are positioned along the body 18 for collecting gas samples within the material 26, and multiple temperature sensors are also positioned along the body 18 for measuring temperatures within the material 26.

As described in more detail below, gas samples are conveyed from each of the gas inlets to a gas analyzer located in a control unit 36, and electrical signals conveying temperature information are routed from each of the temperature sensors to the control unit 36. The control unit 36 uses gas sample information produced by the gas analyzer (e.g., oxygen content information) and the temperature information to control the composting operation.

For example, if the oxygen content of a gas sample from one or more of the gas inlets should fall below a threshold value, the control unit 36 may cause outside air to be introduced into the reactor vessel 12, and the reactor vessel 12 to be rotated, thereby introducing additional oxygen into the material 26 via mixing. If a temperature at one or more of the temperature sensors should exceed a threshold value, the control unit 36 may cause the reactor vessel 12 to be rotated, thereby cooling the material 26 via mixing.

For reasons described below, the reactor vessel 12 of the composting apparatus 10 is tilted such that the material 26 within the reactor vessel 12 tends to gravitate toward the closed end 14. The curving of the upper end 20 of the sensor wand 16 toward the closed end 14 causes the gas inlets and the temperature sensors to remain substantially within the material 26. In addition, the multiple gas inlets and the multiple temperature sensors are clustered in a central portion and end portions of the body 18 of the sensor wand 16. (See FIG. 2.) It has been determined that the curving of the upper end 20 of the sensor wand 16 toward the closed end 14 of the reactor vessel 12, the curving of the lower end 22 away from the closed end 14, and the clustering of the gas inlets and the temperature sensors in the central and end portions of the body 18 of the sensor wand 16, all improve the overall ability of the control unit 36 to control the composting process.

In the embodiment of FIG. 1, the reactor vessel 12 includes a load/unload end 28 opposite the closed end 14. The load/unload end 28 has an opening 30 for loading material into, and unloading material from, the reactor vessel 12. The reactor vessel 12 is tilted such that the material 26 within the reactor vessel 12 does not exit the opening 30 in the load/unload end 28 of the reactor vessel 12. More specifically, the reactor vessel 12 has an axis passing through the load/unload end 28 And the closed end 14, and the reactor vessel 12 is oriented such that an angle "α" exists between a plumb line 34 and the axis 32, wherein α is greater than 0 degrees and less than 90 degrees.

Each of the gas inlets of the sensor wand 16 has a corresponding conduit to convey a gas sample to the gas analyzer located in the control unit 36. Similarly, each of the temperature sensors of the sensor wand has a corresponding electrical lead to convey an electrical signal indicative of a temperature at the temperature sensor to the control unit 36. The conduits and the leads extend from the corresponding gas inlets and temperature sensors through a conduit tube 38 of the sensor wand 16 to the control unit 36.

As described in more detail below, the conduit tube 38 of the sensor wand 16 has two opposed ends. One of the ends of the conduit tube 38 is attached to a central portion of the body 18 of the sensor wand 16 such that the conduit tube 38 extends outwardly from the body 18. The conduit tube 38 exits the reactor vessel 12 through an opening in the closed end 14.

In the embodiment of FIG. 1, a rotation mechanism 40 is coupled to the closed end 14 of the reactor vessel 12. The rotation mechanism 40 rotates the reactor vessel 12 about the axis 32, thereby stirring or agitating the material 26. The rotation mechanism 40 includes a motor or engine 42 and a drive mechanism coupled between the motor or engine 42 and the closed end 14 of the reactor vessel 12. The reactor vessel 12 may have, for example, fin-like structures on an interior surface that are common to cement mixing equipment to stir the contents of the reactor vessel 12 and to aid in the loading and unloading of the reactor vessel 12.

Suitable reactor vessels and rotation mechanisms are well known and commercially available. In the embodiment of FIG. 1, components of the composting apparatus 10 are mounted on a wheeled chassis 44 to allow the composting apparatus 10 to be moved from place to place.

Figure 2:
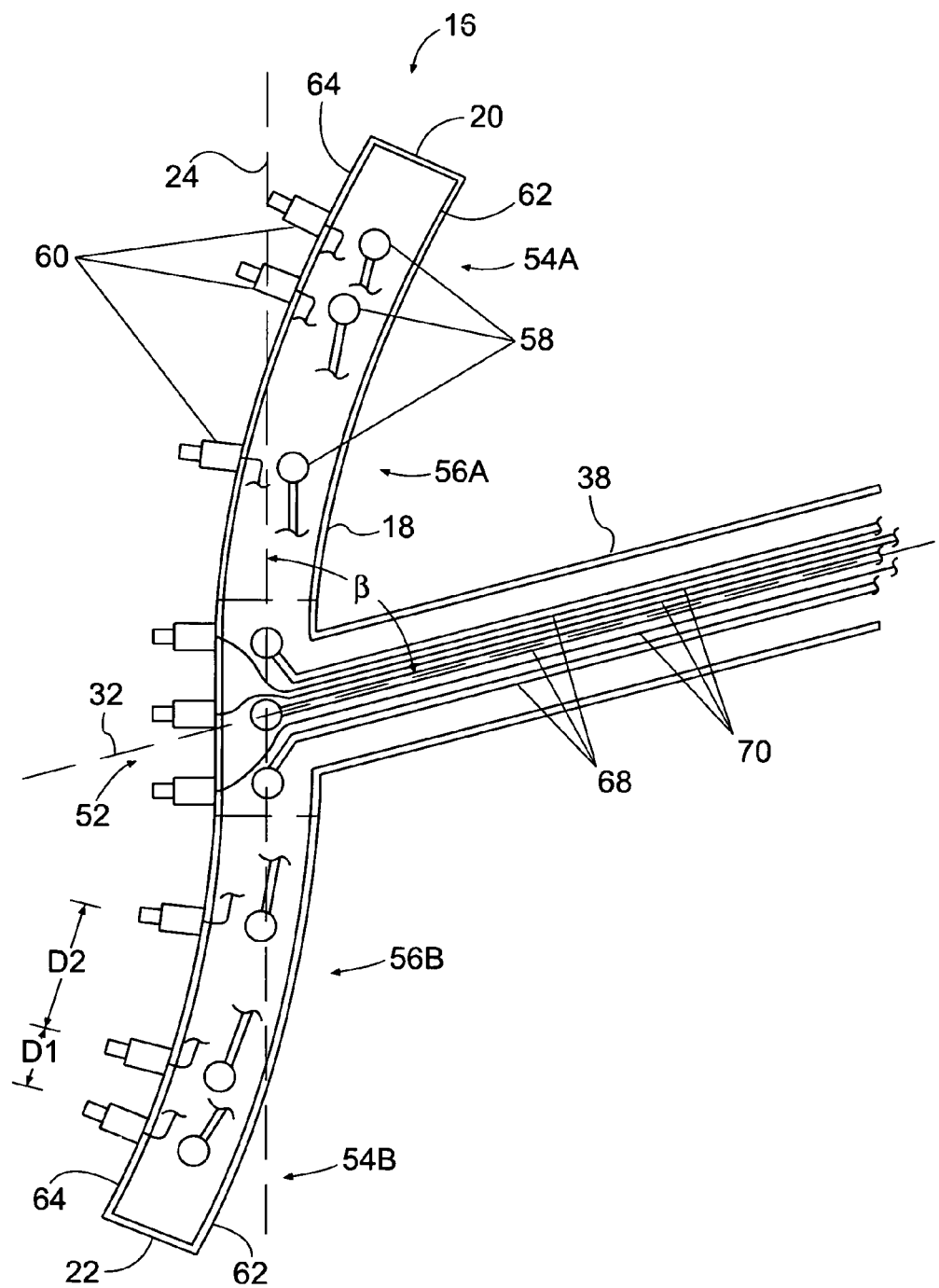
FIG. 2 is a side elevation view of one embodiment of the sensor wand of FIG. 1.

FIG. 2 is a side elevation view of one embodiment of the sensor wand 16 of FIG. 1. In the embodiment of FIG. 2, the sensor wand 16 includes the elongated body 18 having the upper end 20 and the opposed lower end 22 as described above. As illustrated in FIG. 2, the sensor wand 16 has a central axis 24 passing through a central portion 52 of the body 18. In general, the upper end 20 is positioned on one side of the central axis 24, and the lower end 22 is positioned on an opposite side of the central axis 24. More specifically, the upper end 20 and the lower end 22 curve away from the central axis 24 in opposite directions.

The sensor wand 16 has multiple gas inlets 58 positioned along the body 18 for collecting gas samples, and multiple temperature sensors 60 positioned along the body 18 for measuring temperatures. Suitable gas inlets and temperature sensors are well known and commercially available.

In the embodiment of FIG. 2, the body 18 has the central portion 52, an end portion 54A corresponding to the upper end 20, an end portion 54B corresponding to the lower end 22, an intermediate portion 56A between the central portion 52 and the end portion 54A, and another intermediate portion 56B between the central portion 52 and the end portion 54B.

In the embodiment of FIG. 2, the body 18 of the sensor wand 16 has a front surface 62, a rear surface 64 opposite the front surface 62, and two opposed side surfaces between the front surface 62 and the rear surface 64. The temperature sensors 60 are positioned along the rear surface 64 of the body 18, and the gas inlets 58 are positioned along one of the side surfaces of the body 18.

In general, the gas inlets 58 and temperature sensors 60 are concentrated in the central portion 52 and the end portions 54A and 54B. More specifically, a distance "D1" exists between adjacent gas inlets 58 and temperature sensors 60 in the central portion 52 and the end portions 54A and 54B, and a distance "D2" exists between adjacent gas inlets 58 and temperature sensors 60 in the intermediate portions 56A and 56B, where D1 is less than D2.

In the embodiment of FIG. 2, the conduit tube 38 has two opposed ends and an axis 32. One of the ends of the conduit tube 38 is attached to the front surface 62 of the body 18 in the central portion 52 of the body 18 such that the conduit tube 38 extends outwardly from the central portion 52. As indicated in FIG. 2, an angle "β" is formed between the axis 32 of the conduit tube 38 and the central axis 24 of the body 18, where β is about 75 degrees.

In the embodiment of FIG. 2, the sensor wand 16 includes multiple gas tubes 68 each having two opposed ends. One end of each of the gas tubes 68 is connected to a different one of the gas inlets 58, and the other end of each of the gas tubes 68 extends through the conduit tube 38. Similarly, the sensor wand 16 also includes multiple electrical leads 70 each having two opposed ends. One end of each of the leads 70 is connected to a different one of the temperature sensors 60, and the other end of each of the leads 70 extends through the conduit tube 38.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A composting apparatus, comprising:
    a reactor vessel having a closed end and a load/unload end opposite the closed end, wherein the load/unload end has an opening for loading material into, and is loading material from, the reactor vessel, and wherein the reactor vessel is tilted such than material within the reactor vessel does not exit the opening in the load/unload end of the reactor vessel;
    a sensor wand positioned within the reactor vessel adjacent the closed end, the sensor wand comprising:
        an elongated body having an upper end positioned above an opposed lower end and a central axis, wherein the upper end is positioned on one side of the central axis and the lower end is positioned on an opposite side of the central axis;
        a plurality of gas inlets positioned along the body for collecting gas samples; and
        a plurality of temperature sensors positioned along the body for measuring temperatures; and
    wherein the upper end of the sensor wand curves toward the closed end of the reactor vessel, and wherein the lower end of the reactor vessel curves away from the closed end of the reactor vessel;
    wherein the body of the sensor wand comprises a central portion, two end portions, and two intermediate portions between the central portion and the end portions, and wherein distances between gas inlets and temperature sensors in the central portion and the end portions are less than distances between gas inlets and temperature sensors in the intermediate portions.

2. The composting apparatus as recited in claim 1, wherein the body of the sensor wand has a front surface, a rear surface opposite the front surface, and two opposed side surfaces, and wherein the temperature sensors are positioned along the rear surface of the body, and wherein the gas inlets are positioned along one of the side surfaces of the body.

3. The composting apparatus as recited in claim 2, wherein the sensor wand further comprises a conduit tube having two opposed ends, wherein one of the ends of the conduit tube is attached to a central portion of the front surface of the body of the sensor wand such that the conduit tube extends outwardly from the body.

4. The composting apparatus as recited in claim 3, wherein an angle of about 75 degrees is formed between an axis of the conduit tube and the central axis of the body of the sensor wand.

5. The composting apparatus as recited in claim 3, further comprising a plurality of gas tubes each having two opposed ends, wherein one end of each of the gas tubes is connected to a different one of the gas inlets, and wherein the other end of each of the gas tubes extends through the conduit tube.

6. The composting apparatus as recited in claim 3, further comprising a plurality of leads each having two opposed ends, wherein one end of each of the leads is connected to a different one of the temperature sensors, and wherein the other end of each of the leads extends through the conduit tube.

* * * * *